US010366128B2

(12) United States Patent
Olson (10) Patent No.: US 10,366,128 B2
(45) Date of Patent: Jul. 30, 2019

(54) CURATING A DIGITAL MAGAZINE WITH A USER'S OWN CONTENT (71) Applicant: Flipboard, Inc., Palo Alto, CA (US)

(72) Inventor: Ryan Olson, San Francisco, CA (US)

(73) Assignee: Flipboard, Inc., Palo Alto, CA (US)

( * ) Notice: Subject to any disclaimer, the term of this patent is extended or adjusted under 35 U.S.C. 154(b) by 332 days.

(21) Appl. No.: 14/939,920

(22) Filed: Nov. 12, 2015

(65) Prior Publication Data
US 2017/0139562 A1 May 18, 2017

(51) Int. Cl.
G06F 3/048 (2013.01)
G06F 17/50 (2006.01)
G06F 16/9535 (2019.01)

(52) U.S. Cl.
CPC ................................ G06F 16/9535 (2019.01)

(58) Field of Classification Search
None
See application file for complete search history.

(56) References Cited

U.S. PATENT DOCUMENTS

| 7,970,240 | B1* | 6/2011 | Chao | G06F 17/30274 382/305 |
| 8,655,111 | B2* | 2/2014 | Berger | G06F 17/30274 382/306 |
| 9,092,727 | B1* | 7/2015 | Reicher | G16H 40/63 |
| 2005/0097173 | A1* | 5/2005 | Johns | G06F 17/3028 709/206 |
| 2006/0036949 | A1* | 2/2006 | Moore | G06F 3/0482 715/730 |
| 2012/0203371 | A1* | 8/2012 | Hsu | G06T 11/001 700/138 |
| 2017/0366862 | A1* | 12/2017 | Ash | H04N 21/4826 |

* cited by examiner

Primary Examiner — Nhat Huy T Nguyen
(74) Attorney, Agent, or Firm — Fenwick & West LLP (57) ABSTRACT A digital magazine application executing on a client device is configured to receive content items from a user of the client device or from a digital magazine server, generate pages in a digital magazine by processing the received content, and provide the pages to a user of the client device. The client device generates a new personalized digital magazine for a user by enabling the user to select content items stored in the user's local storage of the client device and to create stories about the selected content items. The personalized digital magazine includes the user's own content items, corresponding stories and content items recommended by the digital magazine server, which share common characteristics with the user's own content items. The client device can also include a user's own content items into a magazine currently presented to the user.

20 Claims, 8 Drawing Sheets

CURATING A DIGITAL MAGAZINE WITH A USER'S OWN CONTENT

BACKGROUND

This disclosure relates generally to digital magazines, and more specifically to including users' own content items into digital magazines.

Digital distribution channels disseminate a wide variety of digital content including text, images, audio, links, videos, and interactive media (e.g., games, collaborative content) to users. Users often interact with content items provided by various sources, such as social networking systems, online publishers and blogs. However, existing techniques for user interactions with content items of a digital magazine are generally limited to the interactions with the content items selected by the digital magazine; in other words, content items stored in users' local computer storage are not included in the digital magazine. Failure to enable users to collect what they love into their own magazines to read later or to share with others degrades user experience with consumption of the content items provided by digital magazines.

SUMMARY

A digital magazine is a personalized, customizable application for displaying content items to a user of a client device (e.g., a mobile communication device, tablet, computer, and any other suitable computing system). For example, a digital magazine server or a digital magazine application executing on a user's client device generates a personalized digital magazine for the user by including content items, e.g., a photo stored locally at the client device of the user and other content items recommended by the digital magazine server.

To allow the user to include the user's own content items which are content items stored in a local memory on the user's client device, the client device executing the digital magazine application presents the user options to create a new digital magazine including the user's own content items or to modify a digital magazine currently presented to the user. To create a new digital magazine with the user's own content items, the client device allows the user to tag the content items, e.g., adding captions to the content items, to add stories describing the content items and pick appropriate colors/styles for the content items. In addition to the user's own content items, the digital magazine server recommends additional content items that are likely of interest to the user, e.g., by selecting content items on the same topic as the user's own content items.

To modify a digital magazine currently presented to the user, the client device identifies the content item interacted by the user, e.g., clicked, shared or liked by the user, and presents the user an interface for the user to select the user's own content items stored in a local memory on the user's client device to be associated with the interacted content items. To maintain the artistic harmony in the presentation of the content items recommended by the digital magazine server and the user's own content items, the client device instructs the user to select colors and styles associated with the user's own content items in consistent with the colors and styles of other content items.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Example Digital Magazine System Environment

A digital magazine is a personalized, customizable application for displaying content items to a user of a client device (e.g., a mobile communication device, tablet, computer, and any other suitable computing system). For example, a digital magazine server selects content items from various sources for presentation to a user based on the user's interests and preferences. The content items are sent with instructions for display to the user on a client device. The generated digital magazine is retrieved by a digital magazine application executing on the client device and presented to the user. The generated digital magazine allows the user to more easily consume content that interests by presenting content items in an easily navigable interface via the client device.

One embodiment of a disclosed configuration is a system (or a computer implemented method or a non-transitory computer readable medium) for including users' own content items stored in local memories of users' client devices into web-hosted digital magazines by the system. A "digital magazine" herein refers to an aggregation of digital content items that can be presented to users in a presentable format similar to the format used by print magazines. In one embodiment, a digital magazine assembles a list of universal resource locators (URLs), where each article of the digital magazine is based on the content of a resource on the Internet to which a URL of the list of the URLs references to. A "content item" or "article" herein refers to any machine-readable and machine-storable work product, such as textual articles, pictures/images, videos, user-generated content (e.g., content posted on a social networking system), advertisements, and any other types of digital content capable of display within the context of a digital magazine. In one embodiment, a user's "own content items" refer to content items locally stored in a computer storage of a computing device used by the user to interact with a digital magazine, e.g., a local memory on the user's client device.

Figure 1:
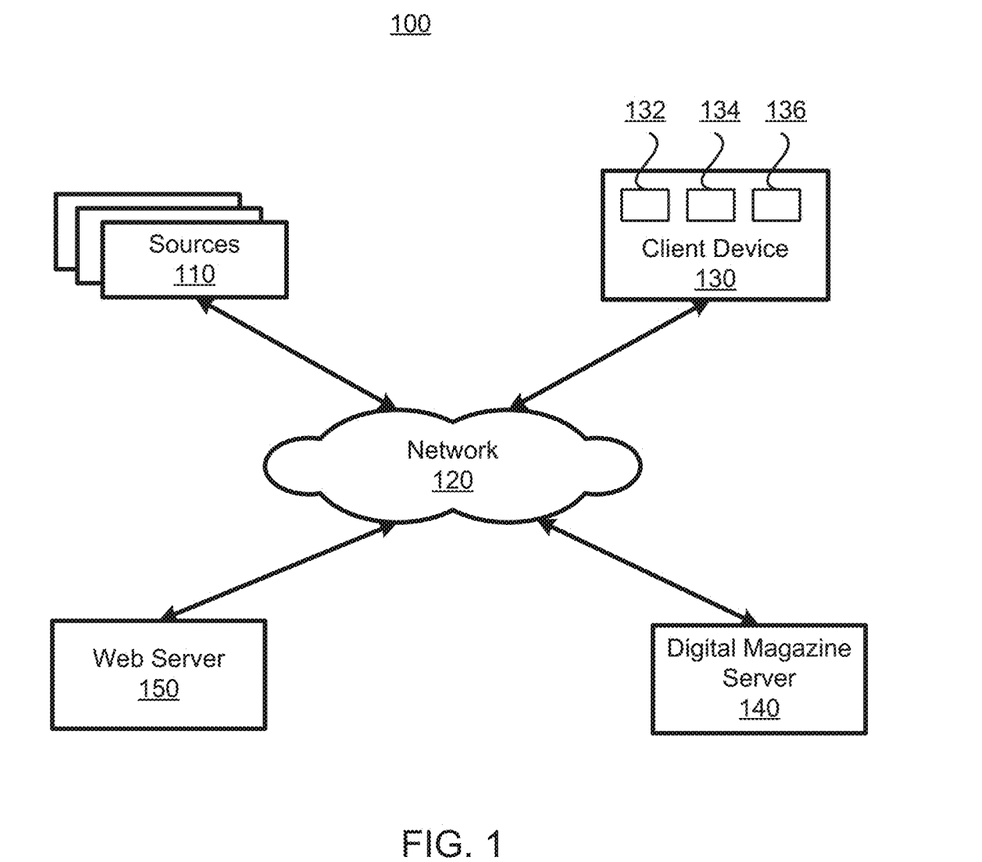
FIG. 1 is a block diagram of a system environment in which a digital magazine server operates according to one embodiment.

FIG. 1 is a block diagram of a system environment 100 in which a digital magazine server 140 operates according to one embodiment. The system environment 100 shown in FIG. 1 includes one or more sources 110, a network 120, a client device 130, the digital magazine server 140 and a web server 150. In alternative configurations, different and/or additional components may be included in the system environment 100. The embodiments described herein can be adapted to online systems that are not digital magazine servers 140.

A source 110 is a computing system capable of providing various types of content to the client device 130 and the digital magazine server 140. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is a computing device capable of receiving user input as well as transmitting and/or receiving data via the network 120. Various embodiments of the client device 130 include a conventional computer system, such as a desktop or a laptop computer, and a device having computer functionality, such as a personal digital assistant (PDA), a mobile telephone, a smartphone or another suitable device. In one embodiment, the client device 130 executes a digital magazine application allowing a user of the client device 130 to interact with the digital magazine server 140. For example, the digital magazine application executing on the client device 130 communicates instructions or requests for content items to the digital magazine server 140. The client device 130 also executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130 for simplicity, in various embodiments, any number of client devices 130 may communicate with the digital magazine server 140.

Different client devices 130 may have different characteristics such as different processing capabilities, different connection speeds with the digital magazine server 140 over the network 120, and different device types (e.g., make, manufacture, and version). For example, in one embodiment, a client device 130 includes a display device 132, an input device 134 and a data storage 136. A display device 132 included in the client device 130, e.g., a liquid crystal display (LCD), an organic light emitting diode (OLED) display, an active matrix liquid crystal display (AMLCD), presents content items to a user of the client device 130.

An input device 134 included in the client device 130, e.g., a touch-sensitive display, a touchless interface (e.g., digital sensors, image capture device), receives input from a user of the client device 130, e.g., a search query, a selected color or story. The user input is processed by a digital magazine application executing on the client device 130 to allow the user to interact with content items presented by the digital magazine server 140.

The data storage 136 included in the client device 130, e.g., a tangible computer readable storage medium or any type of storage medium suitable for storing electronic instructions, stores a user's own content items such as photos/images, video files or audio files, text of a user's blogs, tweets, shared images, video or audio, social networking posts. The content items locally stored in the data storage 136 of the client device 130 can be selected by the user to create a personalized digital magazine, which includes the user selected local content items. Including user's own content items in a digital magazine is further described below with reference to FIG. 4 through FIG. 7.

The web server 150 is a computer system that process requests based on network protocols, e.g., HTTP. In one embodiment, the web server 150 links the digital magazine server 140 via the network 120 to the client device 130, as well as to the one or more sources 110. The web server 150 serves web pages as well as other digital content to the digital magazine server 140 and communicates instructions to the client device 130 for generating pages of content items in a suitable presentation style/format for presentation to a user of the client device 130. In the embodiment shown in FIG. 1, the web server 150 is a network entity separate from the digital magazine server 140. In other embodiments, the web server 150 is a component of the digital magazine server 140.

The digital magazine server 140 receives content items from one or more sources 110 or provided by users of the digital magazine server 140, generates pages in a digital magazine by processing the received content, and provides the pages to the client device 130 or provides instructions to the client device 130 to generate pages in a digital magazine. For example, the digital magazine server 140 determines a page layout by specifying positioning of content items relative to each other based on information associated with a user and generates a page including the content items arranged according to the determined layout for presentation to the user via the client device 130. This allows the user to include content items locally stored in a computer memory on the user's client device into a personalized digital magazine, which can further include content items sharing common characteristics as the user's own content items. Additionally, the digital magazine server 140 allows the user to access content items via the client device 130 in a format that enhances the user's interaction with and consumption of the content items.

Example Digital Magazine Server

Figure 2:
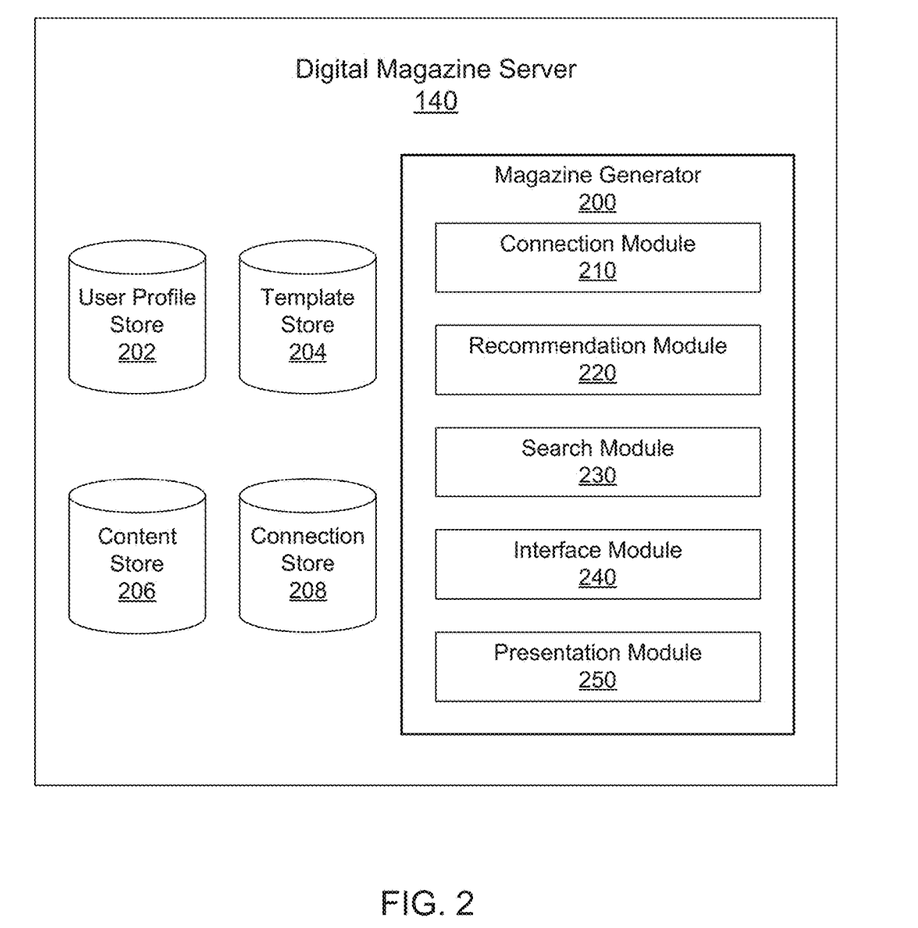
FIG. 2 is a block diagram of a digital magazine server according to one embodiment.

FIG. 2 is a block diagram of a digital magazine server 140 according to one embodiment. The digital magazine server 140 shown in FIG. 2 includes a user profile store 202, a template store 204, a content store 206, a connection store 208 and a digital magazine generator 200. In other embodiments, the digital magazine server 140 may include additional, fewer, or different components for various applications.

The user profile store 202 stores user profiles of users of the digital magazine server 140. Examples of information stored in a user profile include biographic, demographic (e.g., age, gender, occupation, education, socioeconomic status), and other types of information, such as gender, hobbies or preferences, location (e.g., residence, birthplace, check-in locations), or other suitable information. The user profile store 202 may also include information for accessing one or more online networking systems or other types of sources (e.g., a user name, a password, an access code) that a user has authorized the digital magazine server 140 to access. A user profile in the user profile store 202 also includes data describing interactions by a corresponding user with content items presented by the digital magazine server 140. For example, a user profile includes a content item identifier, a description of an interaction with the content item corresponding to the content item identifier, and a time when the interaction occurred.

In addition to storing user profiles for individual users, the user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 204 stores page templates each describing a spatial arrangement ("layout") of content items relative to each other on a page for presentation by a client device 130. A page template includes one or more slots, each configured to present one or more content items. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110.

The content store 206 stores objects that represent various types of digital content items. In one embodiment, the objects are URLs, each of which references to a resource on the Internet. For example, the content store 206 stores content items received from one or more sources 110 (e.g., the resources referenced to by the URLs) within a threshold time of a current time, e.g., 6 months. Examples of content items stored by the content store 206 include page posts, status updates, photographs, videos, links, news articles, audios, check-in events at locations, or any other types of content. A user may specify a section in a digital magazine to include content items having a common characteristic, and the common characteristic is stored in the content store 206 along with an association with the user profile or the user specifying the section.

The connection stores 208 stores interactions between a user and content items presented by the digital magazine server 140. The data describing interactions by a user with a content item includes a content item identifier, a description of an interaction with the content item (e.g., viewing, clicking, sharing, etc.) corresponding to the content item identifier, and a time when the interaction occurred. In one embodiment, the connection stores 208 stores data describing user interactions with content items over a threshold period of time, e.g., 6 months. The long-term interaction data of a user are indicators of ground truth of the user's interest in content times. Content items a user previously interacted with may be retrieved by the digital magazine server 140 using the content item identifiers in the user's user profile, allowing the digital magazine server 140 to recommend content items to the user based on content items with which the user previously interacted.

The magazine generator 200 is configured to receive content items from one or more sources 110 or provided by users of the digital magazine server 140, generates pages in a digital magazine by processing the received content, and provides the pages to the client device 130 or provides instructions to the client device 130 to generate the pages. In the embodiment illustrated in FIG. 2, the magazine generator 200 includes a connection module 210, a recommendation module 220, a search module 230, an interface module 240 and a presentation module 250. Other embodiments of the magazine generator 200 may include different, and/or additional components.

The connection module 210 monitors interactions between users and content items presented by the digital magazine server 140 and stores the detected interactions in the connection store 208. In one embodiment, the connection module 210 detects interactions in response to a user of the digital magazine server 140 providing feedback about a content item, accessing a content item, sharing a content item with other users, or performing other actions with content items. Based on the detected interactions, the connection module 210 weights the interactions in different significance. For example, sharing or commenting on a content item weights more than just viewing the content item; a viewing action for a long time weights more than the same action for a short time. An interaction with a content item having more weight indicates a higher level of interest of the user in the corresponding content item. If multiple content items are connected to a user, the connection module 210 establishes implicit connections between each of the content items connected to the user. In one embodiment, the connection module 210 maintains a user content graph identifying the implicit connections between content items connected to a user. Based on the interactions, the connection module 210 determines connections between various content items, connections between users and content items, or connections between users of the digital magazine server 140.

The recommendation module 220 identifies content items from one or more sources 110 for recommending to a digital magazine server user. In one embodiment, the recommendation module 220 uses the interaction data stored in the connection store to identify content items that are potentially relevant to a user. In one embodiment, the recommendation module 220 uses stored information describing content items (e.g., topic, sections, subsections) and interactions between users and various content items (e.g., views, shares, saved, links, topics read, or recent activities) to identify content items that may be relevant to the user. For example, the recommendation module 220 selects content items having one or more attributes in common with a content item with which an additional user socially connected with the user interacted.

In one embodiment, the recommendation module 220 applies various filters to content items received from one or more sources 110 or from the content store 206 to efficiently provide a user with recommended content items. For example, the recommendation module 220 analyzes content items stored in the content store 206 in view of attributes of a content item provided by the user, e.g., a photo locally stored in a local memory on the user's client device 130. Examples of attributes of a content item include a type (e.g., image, story, link, video, audio, etc.), a source 110 from which a content item was received, time when a content item was retrieved, and subject matter of a content item. For example, the content item provided by a user is a photo of her rescue dog, the relevant subject matters of the user provided content items include, e.g., shelter animals, pet adoption. The recommendation module 220 searches the content store 206 to identify content items associated with the identified subject matter.

In another embodiment, the recommendation module 220 analyzes attributes of content items in view of characteristics of a user retrieved from the user's user profile. Examples of characteristics of a user include biographic information about the user, users connected to the user, and interactions between the user and content items. In one embodiment, the recommendation module 220 analyzes attributes of content items in view of a user's characteristics for a specified time period to generate a set of recommended content items. The set of recommended content items may be presented to the user or may be further analyzed based on user characteristics and on content item attributes to generate more refined set of recommended content items.

The search module 230 retrieve content items from one or more sources 110 or the content store 206 based on a search query received from the interface module 240. For example, content items having at least a portion of an attribute matching at least a portion search query are retrieved from one or more sources 110. To more efficiently identify content items based on search queries, the search module 230 may index content items, groups (or sections) of content items, and user profile information. In one embodiment, the index includes information about various content items, such as topic, author, source, creation data/time, user interaction information, document title, or other information capable of uniquely identifying the content item. Search queries are compared to information maintained in the index to identify content items for presentation to a user. The user may specify sources 110 from which content items are received through settings maintained by the user's user profile or by identifying one or more sources in the search query.

The search module 230 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 230 may assign a weight to the index information associated with each content item selected based on similarity between the index information and a search query and rank the content items based on their weights. For example, content items identified based on a search query are presented in a section of the digital magazine in an order based in part on the ranking of the content items.

The interface module 240 interacts with the client device 130 on behalf of the digital magazine server 140. In one embodiment, the interface module 240 maintains instructions associating received user input with actions performed by the digital magazine server 140 or by a digital magazine application executing on a client device 130. An example of the user input includes identifiers of content items provided by the user, e.g., a photo locally stored in the data storage 136 of the user's client device 130, and instructions for including the content item in a digital magazine. Other examples of the user input include a color selected by the user for a user's own content item, and text describing a story of the user's own content item. The user input can also be a search query for content items from the user of the client device 130.

In one embodiment, the instructions maintained by the interface module 240 associate types of inputs or specific inputs received via an input device 132 of a client device 130 with modifications to content presented by a digital magazine. For example, if the input device 132 is a touch-sensitive display, the interface module 240 includes instructions associating different gestures with navigation through content items presented via a digital magazine. Instructions from the interface module 240 are communicated to a digital magazine application or other application executing on a client device 130 on which content from the digital magazine server 140 is presented.

In one embodiment, the user input, e.g., the content item provided by the user, or the search query, are provided to other modules of the magazine generator 200 for further processing, e.g., the recommendation module 220 and the search module 230. In another embodiment, the instructions from the interface module 240 are communicated to a digital magazine application or other application executing on a client device 130 on which content from the digital magazine server 140 is presented. Inputs received via an input device 132 of the client device 130 are processed by the client device 130 based on the instructions when content items are presented via the digital magazine server 140.

The presentation module 250 facilitates the presentation of content items on the client device 130. In one embodiment, the presentation module 250 retrieves content items from one or more sources 110, from the content store 206, or from the content items provided by a user of the client device 130, and generates a page including the content items based on a page template from the template store 204. For example, the presentation module 250 associates the retrieved content items with one or more slots to generate a page where the retrieved content items are presented relative to each other and sized based on their associated slots. When associating a content item with a slot, the presentation module 250 may associate the content item with a slot configured to present a specific type of content item or to present content items having one or more specified characteristics.

Presenting Content Items in a Digital Magazine

A digital magazine generated by the magazine generator 200 shown in FIG. 2 or by a digital magazine application executing on the client device 130 may be organized into a number of sections, each of which includes content items having a common characteristic (e.g., content obtained from a particular source). For example, a section of the digital magazine includes articles from an online news source (such as a website for a news organization), another section includes articles from a third-party-curated collection of content associated with a particular topic (e.g., endangered species), and an additional section includes content obtained from one or more accounts associated with the user and maintained by one or more social networking systems (e.g., social networking posts). Content included in a section may include textual articles, pictures, videos, products for sale, user-generated content, advertisements, and any other types of content capable of display within the context of a digital magazine.

Figure 3A:
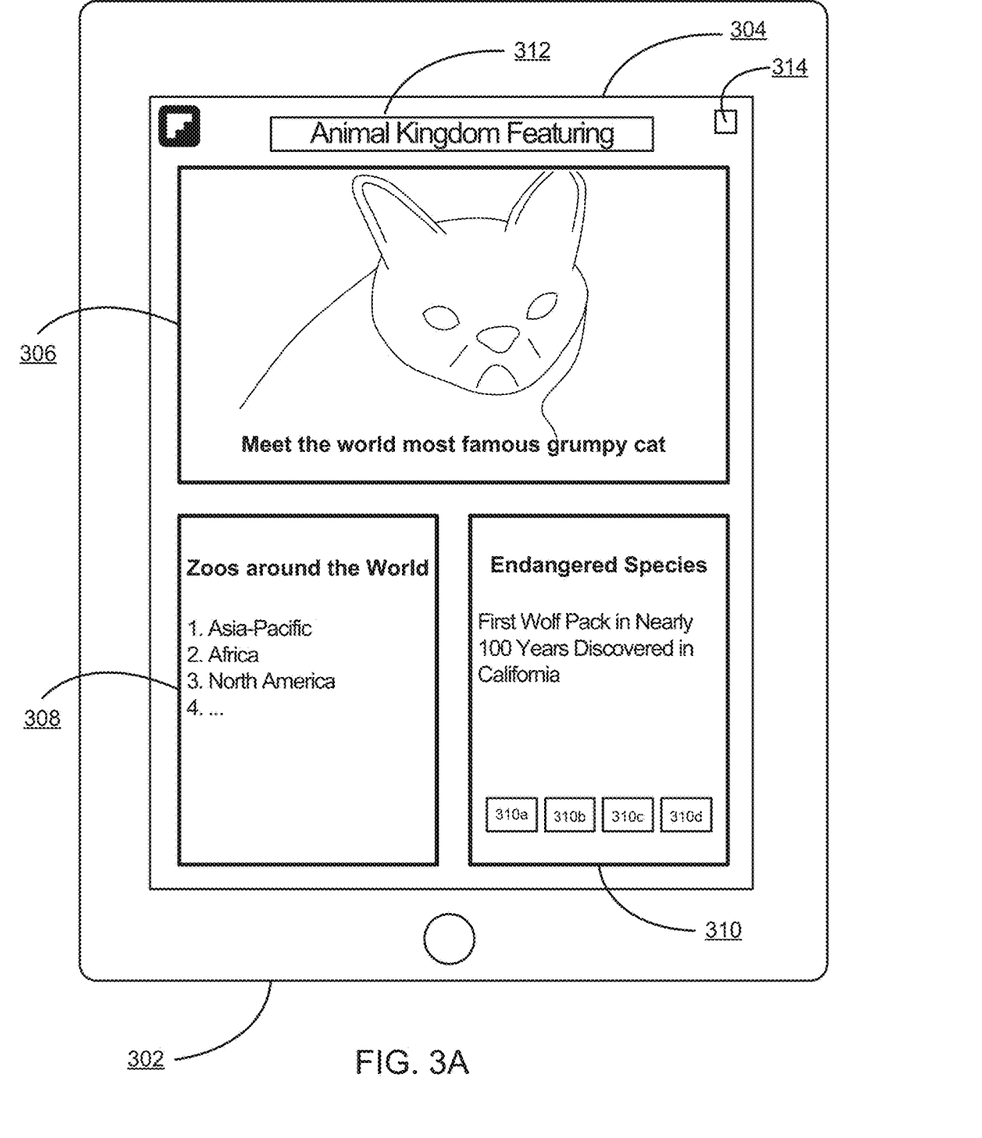
FIG. 3A is an example of presentation of content items in a digital magazine using a page template according to one embodiment.

FIG. 3A is an example of presentation of content items in a digital magazine using a page template 304 according to one embodiment. In the example of FIG. 3A, when a magazine generator 200 generates a page for presentation to a user on a display 302 of the user's client device, the magazine generator 200 populates slots in the page template 304 with content items according to instructions associating content items with slots within the page template 304. For example, the page template 304 has four content sections, 306, 308, 310 and 312, to presenting various content items. The layout (e.g., dimensions and locations) of the content sections 306, 308, 310 and 312 is defined by the instructions associated with the page template 304. A content section may be further divided into subsections, with content items associated with one or more subsections presented in their corresponding subsections. Information describing sections or subsections, such as a characteristic common to content items in a section or subsection, may be stored in the content store 206 and associated with a user profile to simplify generation of a section or subsection for the user.

In the example shown in FIG. 3A, the content section 312 represents a table of contents identifying sections of a digital magazine. For example, the content section 312 includes text or other data indicating that the presented data is a table of contents, such the text "Animal Kingdom Featuring," followed by one or more identifiers associated with various sections of the digital magazine. The content associated with the various sections is presented in content sections 306, 308 and 310. For example, the content section 306 is for presenting a story on the world most famous grumpy cat and is located at an upper center part of the page template 304; the content section 308 is for presenting a story about zoos around the world and is located on the left side below the content section 306; and the content section 310 is for presenting a story about endangered spices and is located on the right side below the content section 306.

In addition to different locations and dimensions, the content sections 306, 308, 310 and 312 are configured to presented different types of contents. For example, the content section 306 is configured to present a photo of the cat, the content section 308 for presenting text describing zoos around the world, and the content section 310 for a combination of text on endangered species and a collection of images (310a, 310b, 310c and 310d). In one embodiment, an identifier associated with a section describes a characteristic common to at least a threshold number of content items in the section. For example, an identifier associated with a section specifies a topic (e.g., animals), an author, a publisher (e.g., a newspaper, a magazine) or other characteristic associated with at least a threshold number of content items in the section. Content items included in a section or the digital magazine as a whole may be related topically and include text and/or images related to the topic. In the example shown in FIG. 3A, the content items presented in sections 306, 308 and 310 share a common theme described by the identifier of the table of contents 312, i.e., something about animals.

To enhance user experience with the digital magazine, the magazine generator 200 or a digital magazine application executing on the client device 130 may include one or more tools in the page template 304 for a user to consume the content items presented to the user. Using FIG. 3A as an example, the page template 304 includes a tool 314 for displaying one or more options to the user. The options presented to the user include, e.g., an option to collect stories into the digital magazine, an option to attach supplemental content to a selected content item currently being presented in the digital magazine, an option to share a selected content item with other users, an option to identify users to receive a selected content item, an option to select a communication channel (e.g., e-mail, social networking system, digital magazine server 140, text message, etc.) to share a selected content item, or other suitable options.

Figure 3B:
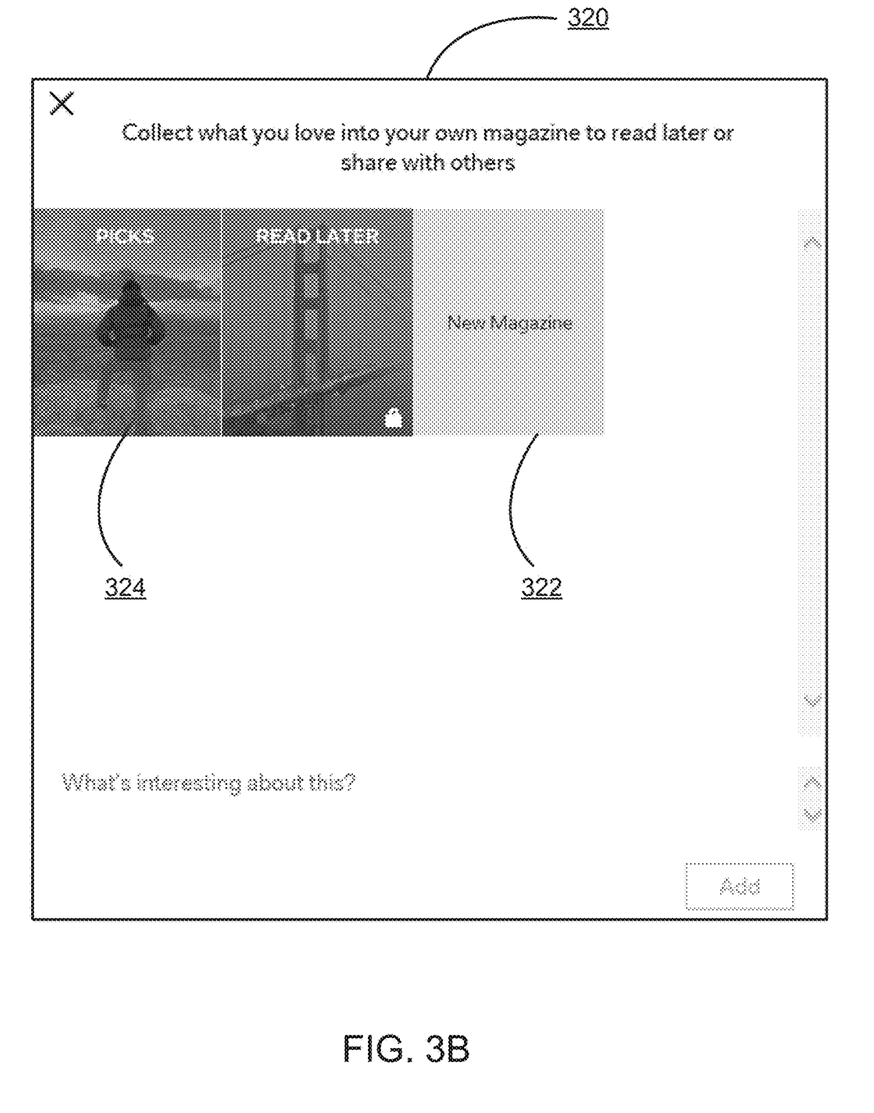
FIG. 3B is an example of a graphical user interface (GUI) for a user to select content items being added into a digital magazine according to one embodiment.

FIG. 3B is an example of a graphical user interface (GUI) 320 for a user to select content items into a digital magazine according to one embodiment. For example, in response to a user selecting the option to collect stories into the digital magazine as explained in connection with FIG. 3A, the digital magazine application executing on the client device presents the user a user interface, e.g., the GUI 320 shown in FIG. 3B. The user can select new magazine 322, where a personalized digital magazine is generated with user's own content items (e.g., photos) and/or other content items recommended by the recommendation module 220 of the magazine generator 200. Alternatively, the user can pick content items 324 to be included into the current digital magazine presented to the user.

Curating a Digital Magazine with Users' Own Content Items

The digital magazine application executing on the client device 130 is configured to receive content items from a user of the client device 130 or from the digital magazine server 140, generate pages in a digital magazine by processing the received content, and provide the pages to a user of the client device 130. In one embodiment, the digital magazine application executing on the client device 130 generates a new personalized digital magazine for a user by enabling the user to select content items stored in the user's local storage of the client device 130 and to create stories about the selected content items. The personalized digital magazine includes the user's own content items, which are content items stored in a local memory on the user's client device 130, corresponding stories and content items recommended by the magazine generator 200, which share common characteristics with the user's own content items. In another embodiment, the digital magazine application executing on the client device 130 includes a user's own content items into a magazine currently presented to the user.

Figure 4:
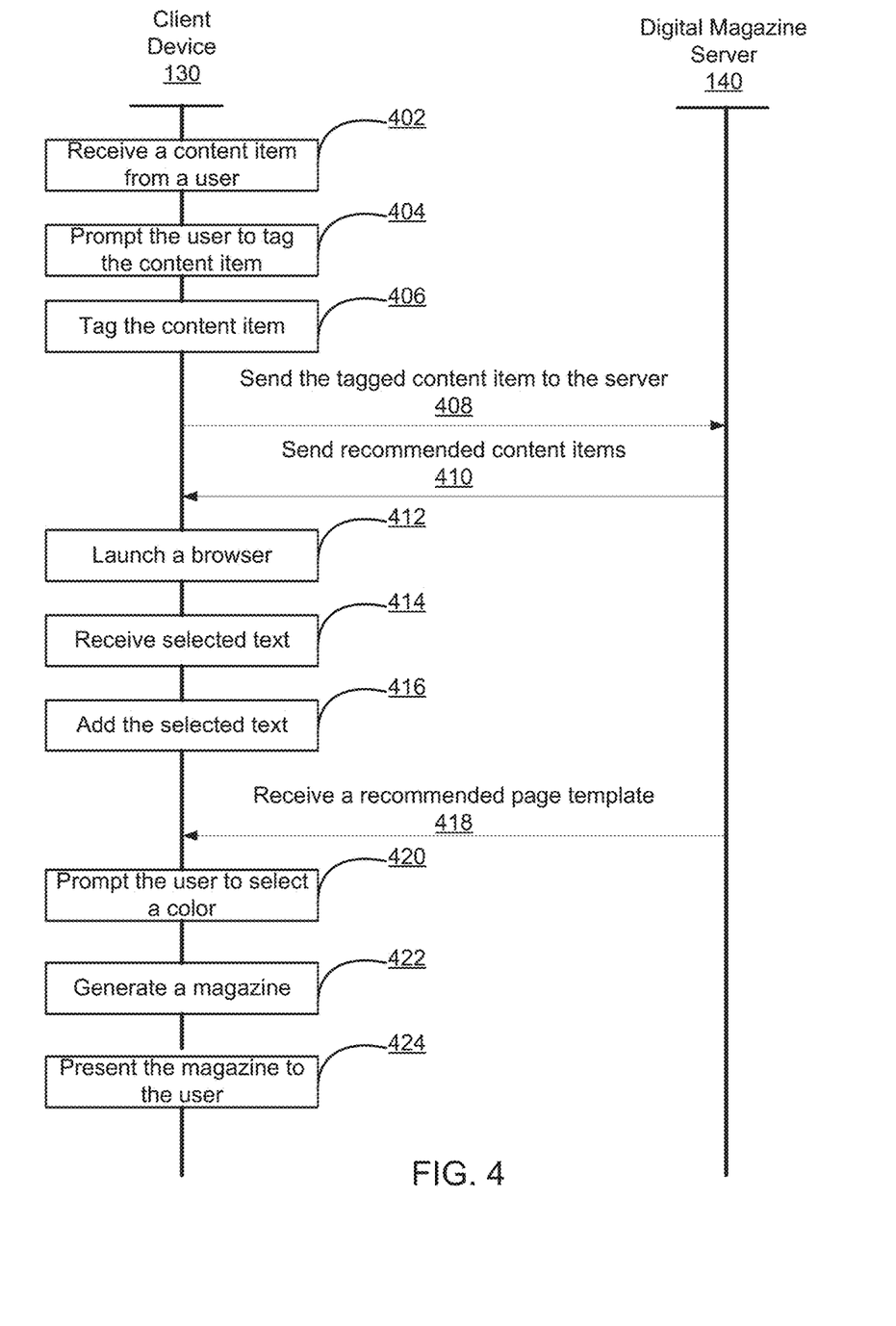
FIG. 4 is an interaction diagram of a method for including a user's own content items in a digital magazine according to one embodiment.

FIG. 4 is an interaction diagram of a method for including a user's own content items in a digital magazine according to one embodiment. Other embodiments of the method may include different and/or additional steps than those shown in FIG. 4. The embodiment of the functionality described in conjunction with the client device 130 in FIG. 4 is provided by a digital magazine application executing on the client device 130. To simplify the description of the functionality performed by the digital magazine application executing on the client device 130, the steps are described with respect to the client device 130 executing the digital magazine application. Alternatively, the similar or same functionality is provided by the magazine generator 200 as described with reference to FIG. 2.

Initially, the client device 130 receives 402 a content item from a user of the client device 130, e.g., a photo locally stored in a computer memory on the client device 130. The client device 130 instructs 404 the user to tag the content item, e.g., add a caption to the content item. The client device 130 receives a caption of the content item from the user and tags 406 the content item. The client device 130 sends the tagged content item to the digital magazine server 140, where the digital magazine server 140 analyzes the tagged content item and recommends one or more relevant content items to be added into the digital magazine. The digital magazine server 140 sends 410 the recommended content items to the client device 130 for further processing.

The client device 130 launches 412 a browser for the user to search for stories about the content item, and instructs the user to select text for a story associated with the user's own content item. The client device 130 receives 414 the selected text for the story from the user and adds 416 the selected text, e.g., as a quote in the caption of the content item. The client device 130 can select a page template or receive 418 one recommended by the digital magazine server 140 to present the user's own content item and additional content items recommended by the digital magazine server 140.

To enhance the appeal of the content item, the client device 130 instructs 420 to select a color for presenting the content item. The client device 130 receives the user selected color and applies the selected color to the content item. If the user's selected color is not artistically in harmony with other content items of the digital magazine, the client device 130 may instruct the user to reselect an appropriate color for the content item. The client device 130 generates 422 a personalized digital magazine to include the user's own content item and presents 424 the generated magazine to the user of the client device 130.

Figure 5:
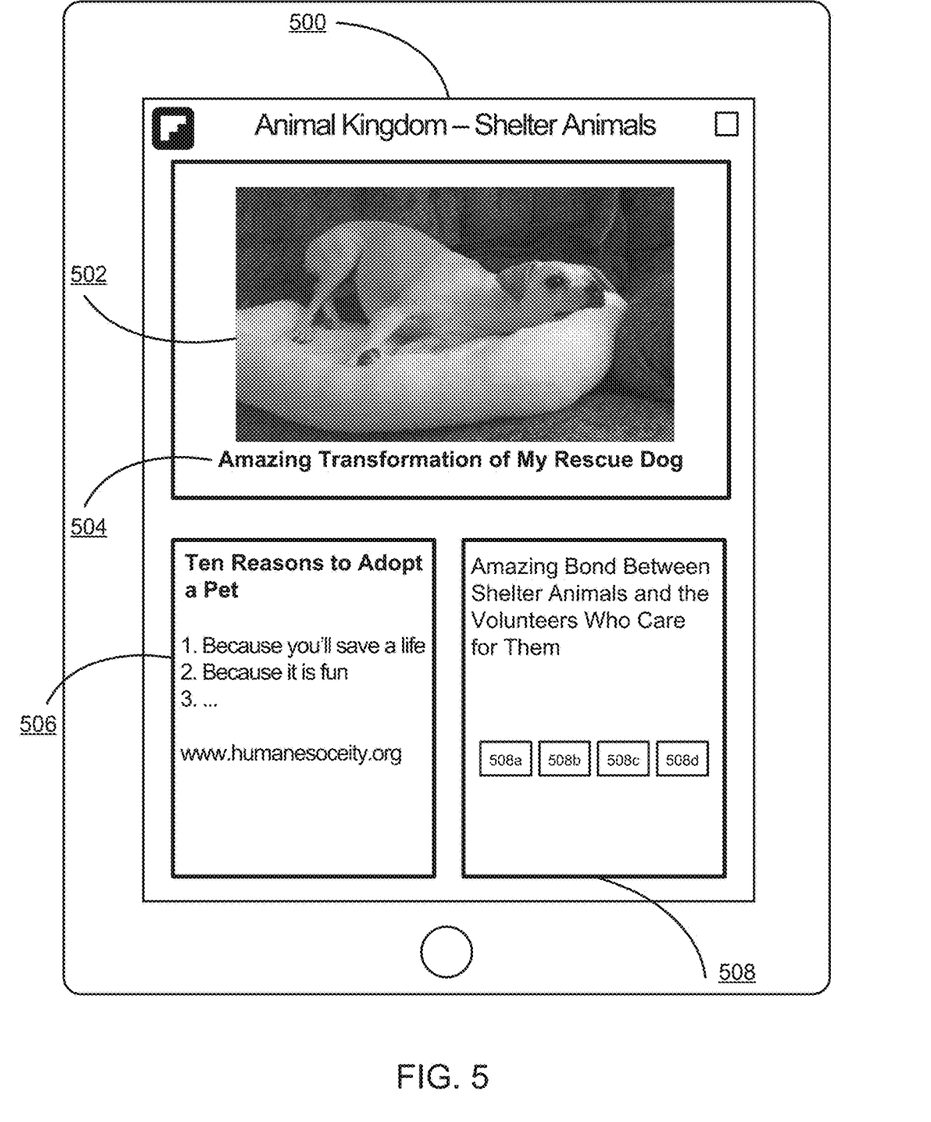
FIG. 5 is an example of presenting a user's own content items included in the user's own digital magazine according to one embodiment.

FIG. 5 is an example of presenting a user's own content items included in the user's own digital magazine according to one embodiment. In the example shown in FIG. 5, the user selects to create a new digital magazine, and the user's own content item is a photo of her rescue dog 502 stored locally in a computer memory on the user's client device. The tag 504 of the content item 502 is "Amazing Transformation of My Rescue Dog", where the user adds a story describing her dog's amazing transformation from a shelter dog to a lovely family pet. The user's own content item 502 is presented at the center of the page template 500 selected by the digital magazine server 140.

In addition to the user's content item 502, the digital magazine server 140 recommends additional content items to be included in the magazine. In one embodiment, the digital magazine server 140 selects the content items in view of the attributes of the content item 502, e.g., a type (e.g., image), and subject matter of a content item (e.g., shelter animals). In another embodiment, the digital magazine server 140 analyzes attributes of content items in view of characteristics of the user retrieved from the user's user profile. In the example shown in FIG. 5, two more content items 506 and 508 are identified and both content items share a common theme with the content item 502, e.g., shelter animals. For example, the content item 506 is a story about ten reasons to adopt a pet, and the content item 508 is a story about amazing bond between shelter animals and the volunteers who care for them, including a collection of pictures 508a-508d showing the amazing bond.

Figure 6:
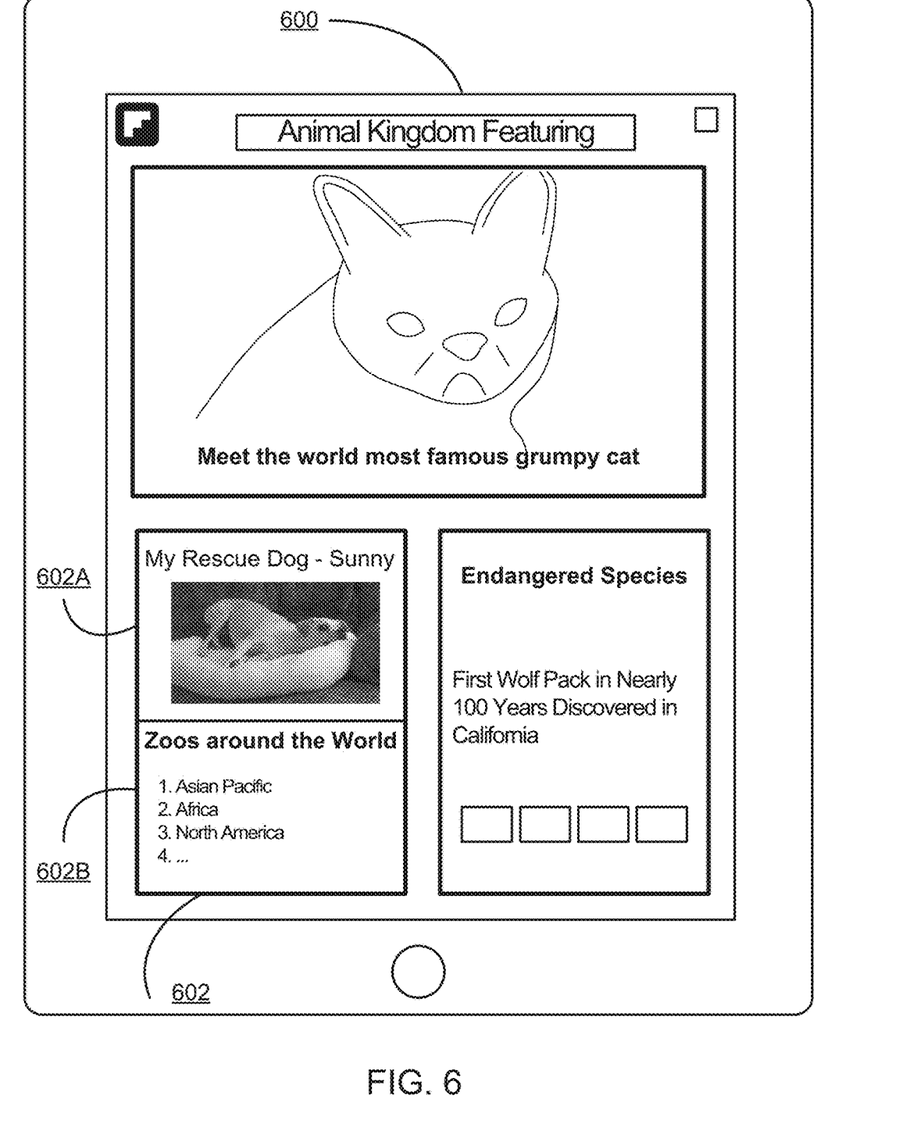
FIG. 6 is an example of presenting a user's own content item included in an existing digital magazine currently presented to the user according to one embodiment.

In a case where a user is presented with a digital magazine and the user decides to add his/her own content items associated with one or more content items presented to him/her, the digital magazine application executing on the client device 130 modifies the digital magazine by including the user's own content items. FIG. 6 is an example of presenting a user's own content item included in an existing digital magazine currently presented to the user according to one embodiment. In the example shown in FIG. 6, the digital magazine currently presented to the user is a magazine 600 (corresponding to the digital magazine as illustrated in FIG. 3A). The user interacts with the story about zoos around the world (308 shown in FIG. 3A), e.g., by clicking the story. The user is interested in adding new content items associated with the story. The digital magazine application executing on the client device 130 presents the user a user interface, e.g., the GUI 320 shown in FIG. 3B, to select his/her own content items. Upon the user selection of his/her own content item, e.g., 602A, the digital magazine application executing on the client device 130 modifies the digital magazine 600, e.g., by splitting the content section 602 into two subsections: 602A for the user's own content item and 602B for the original content item presented in the section 602. The digital magazine application executing on the client device 130 presents the modified digital magazine to the user of the client device 130.

Figure 7:
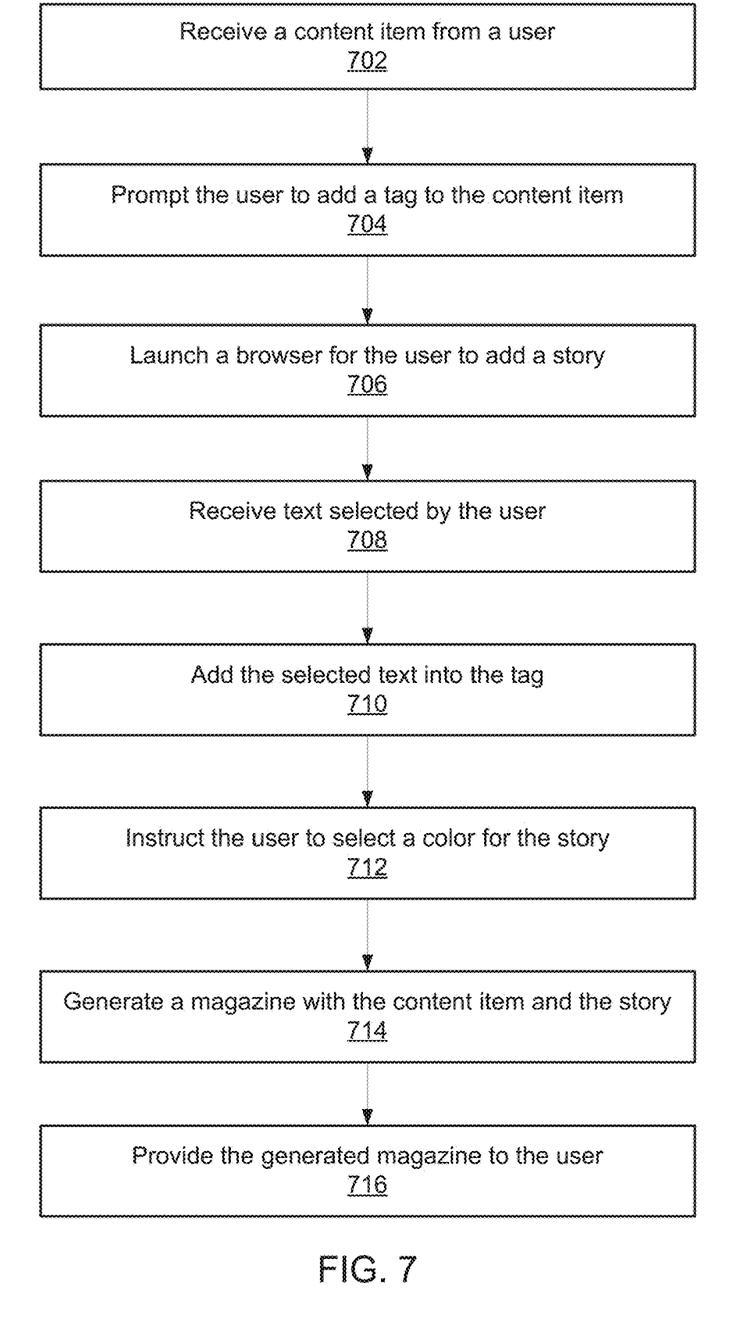
FIG. 7 is a flow chart of a method for including a user's own content item into a digital magazine according to one embodiment.

FIG. 7 is a flow chart of a method for including a user's own content item stored in a local memory on the user's client device into web-hosted a digital magazine according to one embodiment. Initially, the client device 130 receives 702 a content item from a user, e.g., a photo local stored in the user's client device 130, and prompts 704 the user to add a tag to the content item. The client device 130 also launches 706 a browser for the user to add a story about the content item. The user selects a text from a source 110 or from the user's own local storage and sends the selected text to the client device 130. The client device 130 receives 708 the text selected by the user and adds 710 the text into the tag of the content item, e.g., as a quote in the tag of the content item, and instructs 712 the user to select a color for the content item. Upon the user's selection of an appropriate color, e.g., a color in consistent with colors of other content items in a magazine, the client device 130 generates 714 a digital magazine including the user's own content item and one or more content items recommended by the digital magazine server 140, and provides 716 the generated magazine to the user of the client device 130.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for including a user's own content items in a digital magazine, the method comprising:
    receiving, at a client device, a content item from the user of a client device to be included in a digital magazine;
    storing the content item in a local storage medium of the client device;
    instructing, via the client device, the user to select a plurality of attributes associated with the content item, an attribute associated with the content item comprising a color selected by the user for presenting the content item in the digital magazine;
    applying the user selected attributes to the content item by the client device, including
        determining the color selected by the user is not consistent with colors used to present other content items in the digital magazine,
        instructing the user to select an alternative color that is consistent with colors used to present other content items in the digital magazine in response to the determining,
        receiving a selection of the alternative color from the user, and
        applying the alternative color to the content item so the content item is presented in the digital magazine using the alternative color;
    sending the content item and the attributes applied to the content item from the client device to a digital magazine server;
    receiving one or more additional content items from the digital magazine server at the client device, the one or more additional content items selected by the digital magazine server based on the attributes applied to the content item, and a page template associated with a type of the client device and specifying slots identifying relative locations of the one or more additional content items and the content item to each other when the additional content items and the content item are displayed to the user on the client device, each slot also identifying a size for presenting content corresponding to a slot and an aspect ratio for presenting content corresponding to the slot; and
    displaying the one or more additional content items and the content item in display regions of a display device included on the client device, display regions corresponding to slots specified by the page template in which the one or more additional content items are presented specified by the page template with the size and the aspect ratio specified by slots corresponding to display regions presenting the one or more additional content items and a display region corresponding to the slot specified by the page template in which the content item is presented with the size and the aspect ratio specified by the slot corresponding to the display regions presenting the content item specified by the page template according to the page template for displaying the content items from the digital magazine server.

2. The method of claim 1, wherein the plurality of attributes associated with the content item further includes at least one of: a style, a caption and a text describing a story of the content item.

3. The method of claim 1, wherein applying the user selected attributes to the content item comprises:
    adding a caption selected by the user to the content item; and
    adding a text selected by the user to the caption, the text describing a story of the content item.

4. The method of claim 1, further comprising:
    executing a browser application for the user to select one or more stories of the content item.

5. The method of claim 1, wherein the one or more content items from the digital magazine server share at least one common attribute associated with the content item.

6. The method of claim 5, wherein the common attributes associated with the content item includes at least one of: a type of the content item, a source of the content item, time when the content item was received, subject matter of the content item and user profile of the user providing the content item.

7. The method of claim 1, wherein the instructions received from the digital magazine server describe relative positioning of the content items when displayed on a display of the client device.

8. The method of claim 1, further comprising presenting the user a plurality of options for the user to interact with the content items included in the digital magazine.

9. The method of claim 8, wherein the plurality of options for the user to interact with the content items included in the digital magazine comprise at least one of the following:
    an option to collect stories into a digital magazine;
    an option to attach supplemental content to a selected content item;
    an option to share a selected content item with other users of the digital magazine server;
    an option to identify users to receive a selected content item; and
    an option to select a communication channel to share a selected content item.

10. The method of claim 9, wherein the option to collect stories into a digital magazine comprises an option to collect stories into a new digital magazine and an option to collect stories into a digital magazine currently presented to the user.

11. A non-transitory computer-readable storage medium storing executable computer program instructions for including a user's own content items in a digital magazine, the computer program instructions when executed by a computer processor cause the computer processor to:
receive, at the client device, a content item from the user of a client device to be included in a digital magazine;
store the content item in a local storage medium of the client device;
instruct, via the client device, the user to select a plurality of attributes associated with the content item, an attribute associated with the content item comprising a color selected by the user for presenting the content item in the digital magazine;
apply the user selected attributes to the content item by the client device, including
  determining the color selected by the user is not consistent with colors used to present other content items in the digital magazine,
  instructing the user to select an alternative color that is consistent with colors used to present other content items in the digital magazine in response to the determining,
  receiving a selection of the alternative color from the user, and
  applying the alternative color to the content item so the content item is presented in the digital magazine using the alternative color;
receive one or more additional content items from the digital magazine server at the client device, the one or more additional content items selected by the digital magazine server based on the attributes applied to the content item, and a page template associated with a type of the client device and specifying slots identifying relative locations of the one or more additional content items and the content item to each other when the additional content items and the content item are displayed to the user on the client device, each slot also identifying a size for presenting content corresponding to a slot and an aspect ratio for presenting content corresponding to the slot; and
display the one or more additional content items and the content item in display regions of a display device included on the client device, display regions corresponding to slots specified by the page template in which the one or more additional content items are presented specified by the page template with the size and the aspect ratio specified by slots corresponding to display regions presenting the one or more additional content items and a display region corresponding to the slot specified by the page template in which the content item is presented with the size and the aspect ratio specified by the slot corresponding to the display regions presenting the content item specified by the page template according to the page template for displaying the content items from the digital magazine server.

12. The computer-readable storage medium of claim 11, wherein the plurality of attributes associated with the content item further includes at least one of: a style, a caption and a text describing a story of the content item.

13. The computer-readable storage medium of claim 11, wherein applying the user selected attributes to the content item comprises:
adding a caption selected by the user to the content item; and
adding a text selected by the user to the caption, the text describing a story of the content item.

14. The computer-readable storage medium of claim 11, further comprising computer program instructions when executed by the computer processor cause the computer processor to:
execute a browser application for the user to select one or more stories of the content item.

15. The computer-readable storage medium of claim 11, wherein the one or more content items from the digital magazine server share at least one common characteristic associated with the content item.

16. The computer-readable storage medium of claim 15, wherein the common characteristics associated with the content item includes at least one of: a type of the content item, a source of the content item, time when the content item was received, subject matter of the content item and user profile of the user providing the content item.

17. The computer-readable storage medium of claim 11, wherein the instructions received from the digital magazine server describe relative positioning of the content items when displayed on a display of the client device.

18. The computer-readable storage medium of claim 11, further comprising computer program instructions when executed by the computer processor cause the computer processor to present the user a plurality of options for the user to interact with the content items included in the digital magazine.

19. The computer-readable storage medium of claim 18, wherein the plurality of options for the user to interact with the content items included in the digital magazine comprise at least one of the following:
an option to collect stories into a digital magazine;
an option to attach supplemental content to a selected content item;
an option to share a selected content item with other users of the digital magazine server;
an option to identify users to receive a selected content item; and
an option to select a communication channel to share a selected content item.

20. The computer-readable storage medium of claim 19, wherein the option to collect stories into a digital magazine comprises an option to collect stories into a new digital magazine and an option to collect stories into a digital magazine currently presented to the user.

* * * * *

UNITED STATES PATENT AND TRADEMARK OFFICE
CERTIFICATE OF CORRECTION

PATENT NO. : 10,366,128 B2  
APPLICATION NO. : 14/939920  
DATED : July 30, 2019  
INVENTOR(S) : Olson Page 1 of 1

It is certified that error appears in the above-identified patent and that said Letters Patent is hereby corrected as shown below:

In the Claims

In Column 13, Claim 1, Line 45, delete "including" and insert --including:--

In Column 16, Claim 12, Line 4, delete "The computer-readable" and insert --The non-transitory computer-readable--

In Column 16, Claim 13, Line 8, delete "The computer-readable" and insert --The non-transitory computer-readable--

In Column 16, Claim 14, Line 14, delete "The computer-readable" and insert --The non-transitory computer-readable--

In Column 16, Claim 15, Line 20, delete "The computer-readable" and insert --The non-transitory computer-readable--

In Column 16, Claim 16, Line 24, delete "The computer-readable" and insert --The non-transitory computer-readable--

In Column 16, Claim 17, Line 30, delete "The computer-readable" and insert --The non-transitory computer-readable--

In Column 16, Claim 18, Line 34, delete "The computer-readable" and insert --The non-transitory computer-readable--

In Column 16, Claim 19, Line 40, delete "The computer-readable" and insert --The non-transitory computer-readable--

In Column 16, Claim 20, Line 53, delete "The computer-readable" and insert --The non-transitory computer-readable--

Signed and Sealed this  
Twenty-first Day of April, 2020

Andrei Iancu  
*Director of the United States Patent and Trademark Office*